United States Patent [19]

Morgan

[11] Patent Number: 4,879,362

[45] Date of Patent: Nov. 7, 1989

[54] MODIFIED POLYTETRAFLUOROETHYLENE RESINS

[75] Inventor: Richard A. Morgan, Vienna, W. Va.

[73] Assignee: E. I. DuPont De Nemours and Company, Wilmington, Del.

[21] Appl. No.: 140,249

[22] Filed: Dec. 31, 1987

[51] Int. Cl.$^4$ .............................................. C08F 16/24
[52] U.S. Cl. ................................... 526/247; 525/276;
525/902; 428/407
[58] Field of Search ............... 526/247; 525/276, 902;
428/407

[56] References Cited

U.S. PATENT DOCUMENTS

| | | | |
|---|---|---|---|
| Re. 31,907 | 6/1985 | Poirier | 525/276 |
| 3,142,665 | 7/1964 | Cardinal et al. | 260/92.1 |
| 3,951,930 | 4/1976 | Downer et al. | 526/82 |
| 4,038,231 | 7/1977 | Downer et al. | 260/29.6 F |
| 4,129,618 | 12/1978 | Downer et al. | 260/884 |
| 4,134,995 | 1/1979 | Fumoto et al. | 260/884 |
| 4,262,101 | 4/1981 | Hartwimmer et al. | 526/247 |
| 4,391,940 | 7/1983 | Kuhls et al. | 524/458 |
| 4,499,249 | 2/1985 | Nakagawa et al. | 526/247 |
| 4,546,157 | 10/1985 | Nakagawa et al. | 526/247 |
| 4,587,316 | 5/1986 | Nakagawa et al. | 526/247 |
| 4,703,095 | 10/1987 | Nakagawa et al. | 526/247 |

FOREIGN PATENT DOCUMENTS 0124085  4/1984  European Pat. Off. .

*Primary Examiner*—Joseph L. Schofer
*Assistant Examiner*—N. Sarofim

[57] ABSTRACT

New modified non-melt-fabricable polytetrafluoroethylene resins have now been found which can be compounded with elastomers or plastics without the deleterious agglomeration or fibrillation that occurs with known modified non-melt-fabricable polytetrafluoroethylene resins. The resins are made of recurring units of tetrafluoroethylene, and recurring units of at least one comonomer selected from hexafluoropropylene or perfluoro (alkyl vinyl ether) wherein the alkyl group is of 1-4 carbon atoms, said comonomer present in amounts sufficient to produce the effect recited in the first sentence.

10 Claims, No Drawings

MODIFIED POLYTETRAFLUOROETHYLENE RESINS

BACKGROUND

The use of polytetrafluoroethylene as an additive to enhance properties of elastomers or plastics has been a long sought goal because such blends have improved properties such as tear, flame or abrasion resistance over those of the base resin. However, polytetrafluoroethylene develops fibrils and agglomerates when it is subjected to shear forces during compounding with other resins, and the resulting blends are nonuniform and may show excessive modulus and have warping problems. Furthermore, due to the fibrillation and agglomeration, blends which contain known polytetrafluoroethylene resins are difficult to prepare and process, especially at high additive levels.

SUMMARY OF THE INVENTION

New modified polytetrafluoroethylene (PTFE) resins produced by the dispersion process have now been found which can be compounded with elastomers or plastics without the agglomeration or fibrillation that occurs with known modified polytetrafluoroethylene resins. The new resins improve tear strength and abrasion resistance of elastomers, and improve extrusion rates, abrasion resistance and flame resistance of plastics. The new resins avoid the agglomeration and excessive increases in modulus that usually occur when ordinary polytetrafluoroethylene is added to elastomers and plastics, and avoid melt-swell when used with plastics.

The new modified polytetrafluoroethylene resins are made of polytetrafluoroethylene; i.e. recurring units of tetrafluoroethylene (TFE), which contains modifying recurring units of at least one comonomer selected from hexafluoropropylene, perfluoro (alkyl vinyl ether) wherein the alkyl group is of 1-4 carbon atoms, or mixtures of them, said comonomer being present in amounts greater than usually employed in commercial comonomer-modified polytetrafluoroethylene but not present in amounts great enough to cause the polytetrafluoroethylene to lose its non-melt-fabricable character. Enough comonomer units must be present near the surface of the copolymer particles to cause the copolymer to compound uniformly with an elastomer or plastic resin without forming visible agglomerates.

It is believed that it is the presence of sufficient comonomer near the particle surface which inhibits the fibrillation and agglomeration that occurs with previously known polytetrafluoroethylene resins when sheared, as in blending with other polymers. While the comonomer must be present near the surface, the comonomer may be present throughout the copolymer particle, if desired.

The copolymer has sufficient molecular weight and enough comonomer in the shell so that the tensile elongation at break is greater than 60%, the ratio of yield strength to break strength is greater than 0.50, preferably greater than 0.60, and the rheometer pressure is less than 3500 psi (24 MPa) preferably is between 1000 and 2500 psi. The rheometer pressure of the resin is measured by adding 19.2 weight percent "Varsol" hydrocarbon lubricant and extruding the resin through a 1600/1 reduction ratio die. The high comonomer content of the new resins causes their rheometer pressure range to be substantially lower than those of commercially available polytetrafluoroethylene resins, whether modified with comonomer units or unmodified.

When blended into an elastomer or a plastic resin, a procedure that involves shearing action, the modified polytetrafluoroethylene resin will be present in the form of platelets. The platelets are roughly oblong, having a size of between about 10-500 micrometers in length and about one-tenth as thick. In a preferred embodiment, they are about 10-100 micrometers in length, 5-10 micrometers in width and 2-5 micrometers thick. They can be isolated by removing the base resin or elastomer.

DEFICIENCIES OF THE PRIOR ART

Polymerization to make high molecular weight non melt-processible, dispersion-process-produced PTFE resins is well known. The modification of these resins with comonomers and the addition of chain-transfer-agent partway through the polymerization have also been disclosed (such as in Cardinal, Edens, and Van Dyk, U.S. Pat. No. 3,142,665). However, the objectives of these disclosures have clearly been to obtain a resin which fibrillates under shear and is a suitable resin for "paste extrusion". This is shown by the fact that the lowest rheometer pressure which the Cardinal patent mentions was 4700 psig (32.4 MPa) whereas the desired rheometer pressure herein is much lower (1000-3500 psig) (7-24 MPa).

The incorporation of fluoropolymers such as polytetrafluoroethylene into elastomers or thermoplastics has been attempted before. The resins of this invention avoid some of the problems of previously known fluoropolymers and/or show advantages not previously known. High molecular weight, non-melt-processible polymers of tetrafluoroethylene, including those which contain small amounts of comonomers such as hexafluoropropylene, tend to draw out into fibers, or fibrillate, when sheared. Although it is a useful property for some applications such as paste extrusion onto wire, this fibrillation causes problems when the polytetrafluoroethylene or modified polytetrafluoroethylene is to be incorporated into an elastomer or a thermoplastic. The fibrillating polytetrafluoroethylene forms visible agglomerates and results in undesirable increases in modulus when incorporated into elastomers. When compounded into thermoplastics, the fibrillating polytetrafluoroethylene causes undesirable melt swell when the polymer melt is forced through an orifice such as the die at the end of an extruder. The addition of melt-processible fluorocopolymers such as Teflon ® FEP or PFA fluorocarbon resins or low molecular weight, irradiated PTFE, to elastomers or thermoplastics avoids the problems of fibrillation but this approach does not improve certain properties of the elastomer or thermoplastic. In contrast, the resins of this invention do not cause the above-mentioned problems but do improve certain elastomer or thermoplastic properties.

DETAILED DESCRIPTION OF THE INVENTION

The modified polytetrafluoroethylene polymers of this invention are unusual in that unlike most dispersion-produced polytetrafluoroethylene polymers:
(1) They cannot be successfully paste extruded because their green strength is too low,
(2) They form platelets on shear blending into elastomeric compositions instead of fibrillating, (3) Their ratio of yield strength to break strength is over 0.50, whereas for usual dispersion-produced polymers it is generally below 0.5, (4) Their extrusion pressure is less than 3500 psi (24.5 MPa), whereas for usual dispersion-produced polymers it is over 3500 psi.

The monomers are polymerized in aqueous dispersion containing a dispersing agent present in amounts sufficient to cause the polymer particles to remain in dispersed form during polymerization, and then the polymer dispersion is coagulated under low shear to obtain the particles, and the particles are then separated and dried. These particles are called "dispersion-process-produced" particles.

This procedure is described generally in U.S. Pat. 3,142,665. Briefly, polymerization is carried out in a gently agitated aqueous medium with the monomers added under pressure. The medium will contain a non-telogenic dispersing agent such as ammonium perfluorooctanoate or caprylate. The amount of dispersing agent can range from 0.05 to 0.5% by weight of water used, and it can be added in increments if desired.

Any suitable initiator such as is described in U.S. Pat. No. 3,142,665 can be used. A preferred system is a mixture of ammonium persulfate and disuccinic acid peroxide. The initiator amount can vary widely; but generally will be between 0.0005 to 0 3% by weight of water. The initiator will be added at the beginning of the reaction, and may also be added subsequently. Chain transfer agents may also be used and added in the same manner.

As to comonomers, for hexafluoropropylene (HFP), the amount present is at least 0.08 weight percent and can be as high as 0.9 weight percent although the upper limit is not critical. HFP content is determined by the method described at column 5, lines 1–12 of Cardinal, U.S. Pat. No. 3,142,665.

For the perfluoro(alkyl vinyl ethers) (PAVE) of 1–4 alkyl carbon atoms, the amount present should be greater than 0.02 weight percent, and can be as high as 0.3 weight percent. The perfluoro(alkyl vinyl ether) content was determined by Fourier Transform (FT) IR spectroscopy. The C—O—C band occurs at 995 cm$^{-1}$ for perfluoropropylvinyl ether and at 985 cm$^{-1}$ for perfluoromethyl vinyl ether (PMVE). A 0.3 g sample of the polymer was leveled between pieces of aluminum foil in a cylindrical mold, 2.86 cm in inside diameter. A pressure of 1409 kg/cm$^2$ was applied for one minute at ambient temperature. The pressed sample, which was 0.025 cm thick, was then analyzed by IR. The sample was scanned from 1040 to 877 cm$^{-1}$. A straight base line was drawn from the absorbance minimum at 1010 cm$^{-1}$ to that at 889 cm$^{-1}$. The ratio of the absorbance from the base line to the maximum at 985 cm$^{-1}$ or 995 cm$^{-1}$, as the case may be, to the absorbance from the base line to the maximum at 935 cm$^{-1}$ was obtained. The actual weight percent perfluoro(propyl vinyl ether) (PPVE) was obtained by multiplying the ratio by 0.14 (determined from a calibration curve). No calibration curve was established for PMVE but a greater proportion of that added is probably incorporated into the polymer since it is more reactive than PPVE.

A sufficient amount of comonomer must be in the outer portions of the particle. If the comonomer is highly reactive in polymerization, it must be added toward the end of the polymerization to ensure its presence in the outer portions (which are formed last). If the comonomer is not highly reactive, it can be added at the beginning or near the end; or the comonomer/TFE ratio may be increased toward the end of the reaction.

The polymers are non-melt-fabricable. By this is meant that no melt flow is detected when tested by the standard melt viscosity determining procedure for melt-processible polymers. This test is according to American Society for Testing and Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 380.C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 Kpa (6.5 pounds per square inch). If any melt extrudate was observed, it was so noted.

When the polymerization is complete, the polymer in the polymerization medium is coagulated by conventional procedures such as described in U.S. Pat. No. 3,142,665, then dried. Coagulation will occur by use of mild agitation and/or by chemical coagulation. Alternatively, the dispersion may be treated chemically with first a gelling agent and then a water-immiscible liquid to agglomerate the resin, with or without some other filler, as described in various references such as in U.S. Pat. Nos. 4,451,616 and 4,368,296.

In some instances, perfluorobutyl ethylene comonomer is also added in addition to the comonomers previously mentioned. It helps reduce formation of coagulum in the polymerization vessel during polymerization.

The new resins of this invention have an unusually low rheometer pressure, a high level of elongation and a high ratio of yield strength to break strength. They are non-agglomerating and non-fibrillatible, which may be due to the presence of the higher comonomer concentrations in the shell than heretofore was present in modified polytetrafluoroethylene polymers.

The resins of the invention have about the same yield strength as commercial non-melt-processible resins but lower break strengths (thus higher ratios of yield to break strengths). This indicates that the resin apparent modulus (stiffness) due to drawing is less for the resins of the invention. Another indication of this effect is the reduced rheometer pressures measured for the new resins. Both of these observations indicate less fibril or other molecular orientation upon stressing the polymer. This may explain, in part, why uniform blends of the resins of the invention in elastomers and other polymers are easier to prepare and have lower moduli than those obtained with known non-melt-processible resins. Non-uniform blends tend to result in warped molded objects. Reduced fibrillation allows more uniform blends but some toughness as indicated by a minimum elongation is also required for the fluoropolymer to reinforce the other plastics or elastomers. The elongation of a modified PTFE resin is a function of its molecular weight and of the resin comonomer content and type. A reduced PTFE homopolymer molecular weight will reduce the tendency to form fibrils during shear but if the molecular weight is reduced enough to essentially stop fibril formation, the elongation of the resulting resin is too low for it to reinforce another elastomer or plastic. It has been found that the presence of some minimum level of comonomer other than TFE will drastically reduce the tendency to fibrillate without a significant drop in molecular weight and thus elongation. The comonomer may also alter the resin crystallinity and change the form of the drawn fluoropolymer resin from fibril to elongated sheets or plates. This combination of properties is new.

No separate phases are visible to the naked eye in compounded blends of the new resins in other plastics or elastomers. Microphotographs of blends show that even at a magnification as high as 2000X using an optical microscope, no fibrous structure is apparent. If the refractive indices of the blended materials are different, a platelet structure is seen in which the platelet size ranges from 10-100 micrometers long, 5-10 micrometers wide, and 2-5 micrometers thick. At high concentrations in the matrix, the plate-like particles may be interconnected to form discontinuous sheets. The platelets of this invention may be isolated by dissolving away the plastic or elastomer in a suitable solvent. Alternatively the platelets can be obtained by shearing the resin of this invention in a water soluble salt and then dissolving the salt in water, leaving the platelets.

The term "elastomer" as used herein has its normal meaning, that is, the material, after being stretched to twice its normal length and released will return with force to substantially its original length. The term "plastic" as used herein has its usual meaning, that is, a normally rigid, high molecular weight thermoplastic or thermosetting organic polymer usually possessing some crystallinity or glass-like behavior.

Analytical Tests for the New Copolymers

Samples were molded and sintered as described in ASTM D-1457 for the measurement of tensile properties. Microtensile bars were cut and tested as described in ASTM D-1708-80 at a strain rate of two inches per minute (5.1 cm/min).

Rheometer pressure was measured in accordance with ASTM D-1457-83 Section 12.8, except that the resin was not sieved before mixing with the "Varsol" lubricant and the preform was made in a 26 mm diameter extension tube at 300 psi (2.1 MPa). Measurements were made at the 19.2% lubricant level called for in the ASTM method. For additional data presented in the Examples, some samples were tested at 18% lubricant level.

SSG was determined by water displacement of a standard molded test specimen in accordance with ASTM D1457-69. The standard molded part was formed by preforming 12.0 g of the powder in a 2.86 cm diameter die at a pressure of 34.5 MPa, followed by sintering the preform by heating from 300° C. to 380° C. at 2° C/minute, holding at 380° C. for 30 minutes, cooling to 295° C. at 1° C./minute and holding at this temperature for 25 minutes, after which the specimen is cooled to 23° C. and tested for specific gravity.

Raw dispersion particle size or RDPS values were determined by Photon Correlation Spectroscopy using a Brookhaven 2030 Correlator manufactured by Brookhaven Instruments, Inc. of Holtsville, N.Y., using an argon ion laser at 512.5 nm at a 90° angle, and 25° C.

The PBE content of the polymer could not be determined accurately and reproducibly by FTIR. It was estimated to be present in the polymer equal to the amount added because of its high reactivity.

EXAMPLES 1-7

A horizontally-disposed, water-steam jacketed, cylindrical stainless steel autoclave (clave), having a paddlewheel agitator running the length of the autoclave, and having a length-to-diameter ratio of about 1.5 to 1 and a water capacity of 39,000 parts, was charged with 20,400 parts of demineralized water, 5 parts of ammonium perfluorocaprylate dispersing agent and 600 parts of paraffin wax. The autoclave contents were heated to 70° C. and the autoclave was then evacuated and purged with TFE monomer. A reduced pressure was then left on the autoclave, the agitator was turned on at 43 rpm (revolutions per minute) and the contents were heated up to 88° C. Perfluorobutylethylene (PFBE) and/or hexafluoropropylene (HFP) were added to the autoclave and sufficient tetrafluoroethylene (TFE) was added to achieve an autoclave pressure of 380 psig (2.6 MPa). Then 500 parts of the first initiator solution was pumped into the autoclave. After kickoff occured (10 psig or 0.07 MPa drop in pressure), the temperature of the reaction mixture was controlled at 90° C. for the duration of the polymerization. The agitator speed was maintained at 43 rpm and the autoclave pressure was maintained at 380 psig (2.6 MPa) by the addition of tetrafluoroethylene monomer until the desired level of tetrafluoroethylene addition was complete. When 1360 parts of tetrafluoroethylene had been added after kickoff, 1000 parts of a solution of 25 parts ammonium perfluorocaprylate in demineralized water was pumped to the autoclave at 50 parts/minute. After 6800 parts of tetrafluoroethylene had been added after kickoff, 300 parts of a second initiator/methanol solution in demineralized water was added to some of the batches. After the specified tetrafluoroethylene addition was complete (measured after kickoff), the reaction was continued until the pressure reacted down to 185 psig (1.3 MPa). The autoclave was then vented to atmospheric pressure and the dispersion was dropped from the autoclave. After cooling, the supernatant paraffin wax was removed and weighed. The dispersions were coagulated by stirring or by the chemical gelation/solvent agglomeration method to give a powder which was separated and then dried at 150° C. for four days. A summary of the examples and product analyses is given in Tables I and II.

EXAMPLE 8

The autoclave described in Examples 1-7 was charged with 20,400 parts of demineralized water, five parts of ammonium perfluorocaprylate dispersing agent and 600 parts of paraffin wax. The autoclave contents were heated to 80° C. and the autoclave was then evacuated and purged with TFE monomer. A reduced pressure was then left on the autoclave and it was heated up to 88° C. after which it was pressured up to 380 psig (2.6 MPa) with tetrafluoroethylene monomer. The agitator was turned on at 43 rpm and 500 parts were added to the autoclave of a solution of 1.2 parts ammonium persulfate, 15 parts disuccinic acid peroxide, and 3 parts methanol made up to 1500 parts with demineralized water. After kickoff occurred (10 psig or 0.07 MPa drop in pressure), the temperature of the reaction mixture was controlled at 90° C. for the duration of the polymerization. The agitator speed was maintained at 42 rpm and the autoclave pressure was maintained at 380 psig (2.6 MPa) by the addition of tetrafluoroethylene monomer. When 1360 parts of tetrafluoroethylene had been added after kickoff, 1000 parts of a solution of 25 parts of ammonium perfluorocaprylate in demineralized water was pumped into the autoclave at 50 parts/minute. When 5900 parts of tetrafluoroethylene monomer had been added after kickoff, the monomer feed was stopped and the pressure was allowed to react down to 185 psig (1.3 MPa). The autoclave was then vented to 15–20 psig (0.11–0.14 MPa) with the agitator turned off. About 78 parts of hexafluoropropylene were pumped The Example was repeated five times and the polymer of all 6 runs blended.

The product data for the blend are shown in Table III.

TABLE I

POLYMERIZATION SUMMARY EXAMPLES 1-8

| Ex. No. | Wax parts | HFP parts | PFBE parts | First Initiator/Methanol Solution | | | Second Initiator/Methanol Solution | | |
|---|---|---|---|---|---|---|---|---|---|
| | | | | APS[1] parts | DSP[2] parts | Methanol parts | APS parts | DSP parts | Methanol parts |
| 1 | 600 | 78 | 14.5 | 0.9 | 7.5 | 1.0 | 0.54 | 4.5 | 0.6 |
| 2 | 600 | 78 | 0 | 0.73 | 6.0 | 0.8 | 0.44 | 3.6 | 0.5 |
| 3 | 600 | 78 | 14.5 | 0.83 | 6.9 | 1.4 | 0.50 | 4.2 | 0.8 |
| 4 | 600 | 78 | 14.5 | 0.90 | 7.5 | 1.0 | 0 | 0 | 0 |
| 5 | 600 | 78 | 14.5 | 0.83 | 6.9 | 1.4 | 0 | 0 | 0 |
| 6 | 600 | 86 | 14.5 | 0.25 | 7.0 | 0.5 | 0.39 | 3.0 | 1.2 |
| 7 | 600 | 78 | 0 | 0 | 7.0 | 1.0 | 0.30 | 4.2 | 0.9 |

| Ex. No. | TFE Added After Kickoff parts | Dispersion % Solids | RDPS micrometers |
|---|---|---|---|
| 1 | 9900 | 36.5 | 0.196 |
| 2 | 9900 | 36.5 | 0.220 |
| 3 | 9900 | 35.2 | 0.191 |
| 4 | 9900 | 35.3 | NM |
| 5 | 6800 | 28.3 | 0.174 |
| 6 | 9900 | 35.8 | NM |
| 7 | 9900 | 34.7 | 0.232 |

[1] APS means ammonium persulfate
[2] DSP means disuccinic acid peroxide
NM means not measured.

TABLE II

PRODUCT SUMMARY, EXAMPLES 1-8

| Ex. No. | SSG | % HFP | 1600/1 Rheometer Pressure | | Tensile Yield/Break Strength Ratio | Tensile Elongation at Break, % | Melt Flow at 380° C. |
|---|---|---|---|---|---|---|---|
| | | | 18.0% "Varsol" (MPa) | 19.2% "Varsol" (MPa) | | | |
| 1 | 2.225 | 0.52 | 17.0 | 10.5 | 1.00 | 355 | No |
| 2 | 2.253 | 0.41 | 18.0 | 11.0 | 1.26 | 155 | No |
| 3 | 2.227 | 0.29 | 20.9 | 11.5 | 0.76 | 445 | No |
| 4 | 2.228 | 0.40 | 24.8 | NM | 1.18 | 193 | NM |
| 5 | 2.209 | 0.29 | 24.7 | 12.0 | 0.80 | 368 | No |
| 6 | 2.213 | 0.29 | 23.6 | NM | 0.68 | 439 | No |
| 7 | 2.247 | 0.30 | 20.6 | NM | 0.94 | 408 | No |

NM means not measured.

into the clave and the autoclave was then repressurized to 380 psig (2.6 MPa) with tetrafluoroethylene. Another 300 parts of the initiator/methanol solution described above were pumped into the autoclave simultaneously with tetrafluoroethylene repressurization. The agitator was turned on and the speed raised slowly to 40 rpm where it was held for the remainder of the polymerization. After kickoff again occurred, tetrafluoroethylene monomer was added to maintain the 380 psig (2.6 MPa) pressure. After 3630 parts of tetrafluoroethylene had been added after the second kickoff, the agitator was turned off and the autoclave was vented to atmospheric pressure. The dispersion was then dropped from the autoclave at atmospheric pressure and cooled. The dispersion was coagulated by stirring to give a powder which was then isolated and dried at 150° C. for four days. The polymer contained 0.16 weight percent hexafluoropropylene and had an SSG of 2.271. The ratio of polymer weight polymerized during the two stages of reaction was 65/35 including the reaction of a portion of the tetrafluoroethylene used to pressurize the autoclave. The calculated hexafluoropropylene content of the polymer made during the second reaction stage was 0.45 weight percent.

EXAMPLE 9

The autoclave described in the previous examples was charged with 20900 parts of demineralized water and 15 parts of ammonium perfluorocaprylate dispersing agent. The autoclave contents were heated to 65° C. and the autoclave was then evacuated and purged with TFE monomer. A reduced pressure was left on the autoclave, the agitator was then turned on at 43 rpm and 14.5 parts of perfluorobutyl ethylene and 78 parts of hexafluoropropylene were added. The autoclave was heated to 88° C. and it was then pressured up to 380 psig (2.6 MPa) with TFE monomer. Then 500 parts were added to the autoclave of a solution of 14 parts disuccinic acid peroxide (DSP) and 0.4 parts ammonium persulfate (APS) made up to 1000 parts with demineralized water.

After kickoff occurred (10 psig or 0.07 MPa drop in pressure), the temperature of the reaction mixture was controlled at 90° C. for the duration of polymerization. The agitator speed was maintained at 43 rpm and the autoclave pressure was maintained at 380 psig (2.6 MPa) by the addition of TFE monomer until 8170 parts of TFE had been added after kickoff. When 1360 parts of TFE had been added after kickoff, 1000 parts of a solution of 25 parts ammonium perfluorocaprylate in demineralized water was pumped into the autoclave at 90 parts/minute. After 5450 parts of TFE had been added after kickoff, 300 parts of a solution of 10.0 parts disuccinic acid peroxide, 1.0 parts ammonium persulfate, and 5.0 parts methanol made up to 1000 parts with demineralized water was added to the autoclave at 50 parts/minute. The TFE feed was cut off after the addition of 8170 parts TFE (measured after kickoff). Agitation was continued until the autoclave pressure reacted down to 185 psig (1.3 MPa). The autoclave was vented to atmospheric pressure and the dispersion was dropped from the autoclave. The dispersion, which contained about 30.5% solids was coagulated by stirring to give a powder which was dried in a 150° C. oven for four days. Product data are shown in Table III.

EXAMPLE 10

The autoclave described in the previous examples was charged with 20,800 parts of demineralized water, 5 parts of ammonium perfluorocaprylate, and 600 parts of paraffin wax. With the autoclave contents at 65° C., the autoclave was evacuated and purged with tetrafluoroethylene. A reduced pressure was left on the autoclave and it was heated to 85° C. with the agitator on at 43 rpm. The autoclave was then pressured to 380 psig (2.6MPa) with tetrafluoroethylene monomer and 500 parts were added to the autoclave of a solution of 1.0 part APS, 10 parts DSP, and 5 parts methanol made up to 1000 parts with demineralized water. After kickoff (10 psig or 0.07 MPa drop in pressure) occurred, the temperature of the reaction mixture was maintained at 85° C. for the duration of the polymerization. The agitator speed was held at 43 rpm and the autoclave pressure was maintained at 380 psig (2.6 MPa) by the addition of tetrafluoroethylene monomer. When 1360 parts of tetrafluoroethylene had been added after kickoff, 1000 parts of a solution of 25 parts ammonium perfluorocaprylate in demineralized water was pumped into the autoclave at 50 parts/minute. When 5900 parts of tetrafluoroethylene had been added to the autoclave after kickoff, monomer feed and the agitator were stopped and the autoclave contents were cooled to below 75° C. The autoclave was vented and then evacuated to 5" of mercury vacuum. A valve to a cylinder of perfluoromethylvinyl ether (PMVE) was then opened allowing 7.8 parts of the PMVE to enter the autoclave. The valve was then closed, the agitator was restarted at 43 rpm, and the autoclave contents were heated to 85° C. The autoclave was then again repressurized to 380 psig (2.6 MPa) with tetrafluoroethylene monomer and 270 parts were added to the autoclave of a solution of 1.0 part APS, 10 parts DSP, and 5 parts methanol made up to 1000 parts with demineralized water. After kickoff (10 psig or 0.07 MPa drop in pressure) occurred, the temperature of the reaction mixture was maintained at 85° C. for the duration of the polymerization. The agitator speed was held at 43 rpm and the autoclave pressure was maintained at 380 psig (2.6 MPa) by the addition of tetrafluoroethylene monomer. After 1360 parts of tetrafluoroethylene had been added after the second kickoff, the monomer feed was cut off and the pressure as allowed to react down to 185 psig(1.3 MPa). The agitator was then turned off and the autoclave was vented. The dispersion was dropped from the autoclave and cooled. The dispersion was coagulated by stirring and the polymer powder was dried at 150° C. for 3 days. Product data are included in the Table III.

EXAMPLE 11

This polymerization and product isolation was carried out in a similar manner to Example 10 with two exceptions: (1) 14.5 parts of perfluorobutylethylene (PFBE) were added to the autoclave after purging and evacuating (before tetrafluoroethylene addition) and (2) the amount of PMVE added was 7.7 parts.

The product data are included in Table III.

EXAMPLE 12

The clave described in the previous examples was charged with 20,900 parts of demineralized water, 600 parts of paraffin wax, and 1.3 parts of ammonium perfluorocapyrlate dispersing agent. The clave contents were heated to 65° C. and the clave was then evacuated and purged with TFE monomer. A reduced pressure was left on the clave and 7.7 parts of perfluoropropylvinyl ether (PPVE) were added. The agitator was turned on at 46 rpm and the clave was heated to 75° C. The clave was then pressured up to 400 psig with TFE monomer. Then 250 parts were added to the clave at the rate of 50 parts/minute of a solution of 1.4 parts ammonium persulfate made up to 1000 parts with demineralized water. After kickoff occurred (10 psig or 0.07 MPa drop in pressure), the temperature of the reaction mixture was controlled at 75° C. for the duration of polymerization. The agitator speed was maintained at 46 rpm and the clave pressure was maintained at 400 psig (2.6 MPa) by the addition of TFE monomer. When 360 parts of TFE had been added after kickoff, 1000 parts of a solution of 29 parts ammonium perfluorocaprylate in demineralized water was pumped into the clave at 90 parts/minute. After 7490 parts of TFE had been added after kickoff, 1000 parts of a solution of 10.0 parts succinic acid, 0.7 part ammonium persulfate, and 0.7 part methanol made up to 1000 parts with demineralized water was added to the clave at 50 parts/minute. Simultaneously the reactor pressure setpoint was reduced to 200 psig and the pressure was reacted down to that level. This procedure increased the PPVE/TFE monomer ratio. The TFE feed was then continued until 11,800 parts of TFE (measured after kickoff) had been added to the reactor. The agitator was then turned off, the clave was vented to atmospheric pressure, and the dispersion was dropped from the clave. The dispersion, which contained about 37.8% solids, was coagulated by stirring to give a powder which was separated and then dried in a 150° C. oven for three days.

Product data are shown in Table III.

EXAMPLE 13

In this example, polymerization was carried out as in Example 13 with the following exceptions: (1) the reactor precharge contained 1.0 part ammonium perfluorocaprylate, 5 parts succinic acid, 20,900 parts demineralized water, and 600 parts of paraffin wax, (2) the amount of PPVE added after evacuation was 12.2 parts and (3) the second initiator solution, added after 7490 parts of TFE addition, contained 0.7 part of ammonium persulfate and 0.7 part of methanol (no succinic acid) made up to 1000 parts with demineralized water. The resin was coagulated and dried.

Product data are shown in Table III.

EXAMPLE 14

A blend of 1 part of polymer powder from Example 9 with 19 parts granular potassium chloride was placed in a oven at 100° C. for two hours. The blend was then removed from the oven and immediately poured into a preheated (100° C.) mortar where it was ground with a pestle for one minute. The potassium chloride was then dissolved away with a water/methanol mixture, leaving the polymer. After drying at 150° C., the polymer was examined with a microscope and was found to be present primarily as platelets from 10 to 500 micrometers across and about one tenth as thick.

As a control, 5 parts of a commercial "fine powder" paste extrusion resin, which contained HFP as a modifier, was treated identically to that above. The polymer, after washing and drying, was present as fibrous agglomerates. There was no evidence of the platelet structure.

Measurements were made both in the direction of mill rotation and transverse direction and then averaged.

| Sample | Control A | B | C | D |
|---|---|---|---|---|
| Tested at 25° C. | | | | |
| Tear Strength (kN/m) | 4 | 6 | 7 | 7 |
| M₁₀₀ (MPa) | 4 | 5 | 7 | 9 |
| TB (MPa) | 15 | 15 | 15 | 16 |
| EB (%) | 260 | 260 | 250 | 230 |
| Tested at 177° C. | | | | |
| Tear Strength (kN/m) | 0.5 | 0.9 | 1.6 | 2.3 |
| M₁₀₀ (MPa) | — | 4 | 4 | 4 |
| TB (MPa) | 3 | 4 | 5 | 6 |
| EB (%) | 95 | 225 | 125 | 110 |

$M_{100}$ = Modulus at 100% elongation.
TB = Tensile strength.
EB = Elongation at break.

TABLE III

PROPERTY DATA SUMMARY FOR EXAMPLES 8-13

| Example No. | SSG | Comonomer Type | Comonomer Level | 1600/1 Rheometer Pressure 18.0% "Varsol" (MPa) | 1600/1 Rheometer Pressure 19.2% "Varsol" (MPa) | Tensile Yield/Break Ratio | Elongation at Break | Melt Flow at 380° C. |
|---|---|---|---|---|---|---|---|---|
| 8 (Blend of six runs) | NM | HFP | 0.16% | 16.4 | 8.5 | 1.29 | 447% | No |
| 9 | 2.198 | HFP | 0.29% | 20 | 11.4 | 0.58 | 427 | No |
| 10 | 2.274 | PMVE | 0.090%* | 12.0 | NM | 1.21 | 416 | NM |
| 11 | 2.219 | PMVE | 0.089%* | 22.1 | 11.0 | 0.57 | 522 | No |
| 12 | 2.179 | PPVE | 0.03% | 25.6 | 21.6 | 0.53 | 400 | No |
| 13 | 2.179 | PPVE | 0.04% | 28.9 | 23.1 | 0.54 | 474 | NM |

*Comonomer levels shown are levels added to batch.
NM means not measured.

The following examples describe blending of the new modified polytetrafluoroethylene resins with elastomers and thermoplastics.

Utility Example 1

A modified PTFE fine powder copolymer resin was prepared as in Example 9. Samples of the modified PTFE copolymer were mixed with a 45 Mooney Viscosity elastomeric VF2/HFP 60:40 (by weight) copolymer (vinylidene fluoride/hexafluoropropylene), fillers and curatives on a two roll rubber mill at a shear strain rate of about 100 sec⁻¹ for 10 minutes according to the following recipe.

| Sample | Control A | B | C | D |
|---|---|---|---|---|
| | Parts | | | |
| VF2/HFP copolymer | 96 | 96 | 96 | 96 |
| Example 9 PTFE polymer | — | 10 | 20 | 30 |
| Carbon Black (MT Black) | 30 | 30 | 30 | 30 |
| Ca(OH)₂ | 6 | 6 | 6 | 6 |
| MgO | 3 | 3 | 3 | 3 |
| Additive 1* | 1.28 | 1.28 | 1.28 | 1.28 |
| Additive 2** | 2.8 | 2.8 | 2.8 | 2.8 |

*A 2:1 blend of a VF2/HFP copolymer with benzyltriphenylphosphonium chloride.
**A 48:50:2 blend of a VF2/HFP copolymer with bisphenol AF and rice bran wax.

After mixing, sheets were formed and press-cured at 177° C. for 15 minutes, then post cured at 232° C. for 24 hours.

Samples were die cut from the cured sheet and tested at 25° C. and 177° C. for tear strength according to ASTM method D470 and for tensile properties according to ASTM method D412.

The control blend (A) is a representative commercial VF2/HFP elastomeric copolymer formulation. All blends processed well providing smooth, rubbery homogenous appearing slabs and test pieces. When the Example 9 PTFE polymer was mill-mixed into the VF2/HFP copolymer, during preparation of samples B, C and D there was no agglomeration of the Example 9 PTFE polymer. Examination of test pieces, prior to addition of black and curatives, using an optical microscope, as well as transmission and scanning electron microscopes showed the Example 9 PTFE polymer to be uniformly dispersed as distinct particles with no evidence of fibrillation. Plate-like aggregates of size 10×5×2 (micrometers), composed of distinct particles were observed. Comparison of samples B, C and D with the control, A, sows that Example 9 PTFE polymer provides a significant degree of reinforcement and improvement in tear strength at 25° C. and at 177° C., with no fibrillation or agglomeration into visible clumps or nodes.

The copolymers of Examples 4, 10 and 12 behaved in a like fashion when blended with the VF₂/HFP elastomer.

COMPARATIVE EXAMPLE 1

A sample of 20 parts of a commercially available PTFE paste extrusion resin, which has no comonomer in the shell and which has a ratio of yield strength to break strength of only 0.43, and which has a rheometer pressure of 35 MPa at a reduction ratio of 1600:1 was mixed with 100 parts of a 45 Mooney Viscosity VF2/HFP 60:40 (by weight) elastomeric copolymer on a two roll rubber mill at a shear strain rate of about 100 sec$^{-1}$ for 10 minutes. It was observed that the PTFE resin partially agglomerated into visible white clumps or nodes approximately 2-4 mm in diameter with long fine fibrils connecting the nodes. Additional mixing tended to cause further agglomeration rather than to improve dispersion. The blend had a high modulus.

COMPARATIVE EXAMPLE 2

This example demonstrates that the PTFE must be non melt-fabricable.

Two melt-fabricable copolymers based on TFE were mixed with a 45 Mooney Viscosity VF2/HFP 60:40 copolymer, fillers and curatives on a two roll rubber mill at a shear strain rate of 100 sec$^{-1}$ for 10 minutes according to the following recipe:

| Sample | Control A | B | C |
|---|---|---|---|
| | | Parts | |
| VF2/HFP Copolymer | 96 | 96 | 96 |
| TFE Copolymer #1 | — | 20 | — |
| TFE Copolymer #2 | — | — | 20 |
| MT Black | 30 | 30 | 30 |
| Ca(OH)$_2$ | 6 | 6 | 6 |
| MgO | 3 | 3 | 3 |
| Additive 1* | 1.28 | 1.28 | 1.28 |
| Additive 2** | 2.8 | 2.8 | 2.8 |

*A 2:1 blend of a VF2/HFP copolymer with benzyltriphenylphosphonium chloride.
**A 48:50:2 blend of a VF2/HFP copolymer with bisphenol AF and rice bran wax.

TFE copolymer #1 is a melt-fabricable, thermoplastic copolymer containing 84 weight percent TFE and 16 weight percent hexafluoropylene; melt flow number 6.5 (ASTM D 2116). TFE Copolymer #2 is a melt-fabricable, thermoplastic copolymer containing 97 weight percent TFE and 3 weight percent perfluoropropyl vinyl ether; melt flow number 13.

After mixing, sheets were formed and press-cured at 177° C. for 15 minutes, then post cured at 232° C. for 24 hours.

Samples were die cut from the cured sheet and tested as in Utility Example 1.

| Sample Tested at 25° C. | A | B | C |
|---|---|---|---|
| Tear Strength (kN/m) | 4 | 3 | 3 |
| M$_{100}$ (MPa) | 4 | 4 | 4 |
| T$_B$ (MPa) | 15 | 10 | 12 |
| E$_B$ (%) | 260 | 200 | 200 |

The control sample, A, is a representative commercial VF2/HFP copolymer formulation. Samples B and C, which contain melt-fabricable copolymers based on TFE, processed well and provided smooth, rubbery, homogeneous appearing slabs and test pieces. There was no apparent agglomeration or fibrillation of the TFE based copolymer.

Comparison of samples B and C with the control, A, shows that melt-fabricable copolymers based on TFE do not provide any degree of reinforcement to the elastomer and in fact reduce certain tensile and tear properties. Therefore, even though melt-fabricable copolymers based on TFE can be added to elastomers, at high levels, with no agglomeration or fibrillation, they act as nonreinforcing fillers and have limited value.

UTILITY EXAMPLE 2

Dry blends were prepared of a commercially available melt-processible tetrafluoroethylene/hexafluoropropylene (TFE/HFP) copolymer, containing 88% TFE and 12% HFP and having a melt flow number of 6.8, with several levels of both a commercially available high molecular weight dispersion-process-produced TFE homopolymer powder and powder from Example 1 above. These blends were then extruded through a combination of a 28 mm twin-screw extruder feeding a 1.5 inch single-screw extruder which fed a die. After extrusion, the blends were passed through a melt indexer at 372° C. under the conditions described herein for measuring standard melt viscosities. The percent melt swell values were then obtained by comparing the diameters of the extrudates with the melt indexer orifice. The results below show that the modified resin of Example 1 affords much less melt swell than the commercially available PTFE homopolymer.

| Additive to Melt-Processible TFE/HFP | Melt Swell |
|---|---|
| None | 7.0% |
| 0.6% High Molecular Weight PTFE | 70% |
| 3.0% High Molecular Weight PTFE | 158% |
| 0.5% Example 1 Powder | 7.0% |
| 1.5% Example 1 Powder | 29% |
| 4.8% Example 1 Powder | 30% |
| 9.1 Example 1 Powder | 38% |

UTILITY EXAMPLE 3

Dry blends were prepared and extruded as above of mixtures of a melt-processible tetrafluoroethylene/perfluoro(propyl vinyl ether) (TFE/PPVE) copolymer, containing 97% TFE and 3% PPVE and having a melt flow number of 13, with 3% of powder from Example 1 and with 3% low molecular weight irradiated PTFE. Films 7-8 mils thick of each blend and of the unmodified copolymer were compression molded at 350° C. and then immediately quenched in cold water. The fatigue resistance of the films were measured by the MIT flex life test described in U.S. 2,946,763. It can be seen from the results below that the addition of irradiated PTFE reduced the number of flex cycles whereas the Example 1 powder actually raised the number of cycles to failure.

| Sample | Number of Flex Cycles to Failure |
|---|---|
| Control of TFE/PPVE melt-processible Copolymer | 4945 |
| Control resin containing 3% irradiated PTFE powder | 3395 |
| Control resin containing 3% Example 1 powder | 5535 |

I claim:

1. A dispersion-process-produced non-melt-processible tetrafluoroethylene copolymer comprising recurring units of tetrafluoroethylene and a comonomer selected from the class consisting of hexafluoropropylene, perfluoro (alkyl vinyl ether) where the alkyl group has 1-4 carbons, and a mixture of them; with enough comonomer present in the shell to cause the copolymer to compound uniformly with an elastomer or plastic without forming visible agglomerates.

2. A dispersion-process-produced non-melt-processible tetrafluoroethylene copolymer comprising recurring units of tetrafluoroethylene and a comonomer selected from the class consisting of hexafluoropropylene, perfluoro (alkyl vinyl ether) where the alkyl group has 1-4 carbons, and a mixture of them; wherein the copolymer has a sufficient molecular weight and enough comonomer in the shell so that the tensile elongation at break is greater than 60%, the ratio of yield strength to break strength is greater than 0.50, and the rheometer pressure is less than 24.1 MPa.

3. The copolymer of claim 2 wherein the comonomers are distributed in such a manner that the copolymer compounds uniformly into an elastomer without forming visible agglomerates.

4. The copolymer of claim 1 wherein the copolymer has a tensile elongation greater than 100%, a ratio of strength to yield to break strength ratio greater than 0.60.

5. The copolymer of claim 1, 2 or 3 wherein the comonomer is hexafluoropropylene and is present in an amount of at least 0.08 weight percent.

6. The copolymer of claim 1, 2 or 3 wherein the comonomer is perfluoro(alkyl vinyl ether) and is present in an amount greater than 0.02%.

7. The polymer of claim 1, 2 or 3 wherein perfluorobutyl ethylene is also present as a third comonomer.

8. The copolymer of claim 5 wherein units of perfluorobutyl ethylenes are also present.

9. The copolymer of claim 1 or 2 in the form of platelets.

10. The copolymer of claim 9 wherein the platelets are oblong, having a length between about 10-500 micrometers.

* * * * *